(12) United States Patent
Johnson et al.

(10) Patent No.: US 8,656,066 B2
(45) Date of Patent: Feb. 18, 2014

(54) MONITORING INPUT/OUTPUT OPERATIONS TO SPECIFIC STORAGE LOCATIONS

(75) Inventors: Gavin S. Johnson, San Jose, CA (US);
Michael J. Koester, Hollister, CA (US);
John R. Paveza, Morgan Hill, CA (US);
Carrie J. Van Noorden, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 12/970,681

(22) Filed: Dec. 16, 2010

(65) Prior Publication Data

US 2012/0159006 A1 Jun. 21, 2012

(51) Int. Cl.
*G06F 3/00* (2006.01)
*G06F 5/00* (2006.01)

(52) U.S. Cl.
USPC .............................................. 710/15; 710/36

(58) Field of Classification Search
None
See application file for complete search history.

(56) References Cited

U.S. PATENT DOCUMENTS

| | | | |
|---|---|---|---|
| 7,031,085 B2 | 4/2006 | Miller et al. | |
| 7,394,607 B2 | 7/2008 | Ohno et al. | |
| 2006/0168450 A1* | 7/2006 | Yagawa | ........................ 713/176 |
| 2008/0072306 A1* | 3/2008 | Krasnoiarov et al. | ........... 726/12 |
| 2009/0213487 A1 | 8/2009 | Luan et al. | |

* cited by examiner

*Primary Examiner* — Zachary K Huson
(74) *Attorney, Agent, or Firm* — Janaki K. Davda; Konrad, Raynes, Davda & Victor LLP

(57) ABSTRACT

Provided are techniques for storing one or more storage rules for each of one or more storage locations, along with one or more actions to be taken for each storage rule that is violated, intercepting an I/O operation issued to the storage subsystem, and determining whether the I/O operation violates one or more of the storage rules. In response to determining that the I/O operation violates one or more of the storage rules, an application that issued the I/O operation is identified and each of the one or more actions associated with the one or more violated storage rules are performed.

12 Claims, 5 Drawing Sheets

MONITORING INPUT/OUTPUT
OPERATIONS TO SPECIFIC STORAGE
LOCATIONS

BACKGROUND

1. Field

Embodiments of the invention relate to monitoring Input/Output (I/O) operations to specific storage locations based on one or more storage rules.

2. Description of the Related Art

There is a problem in which tracks on a volume are expected to be in a certain format and a write operation may occur that changes the format of the contents of the track. For example, the tracks that represent a Volume Table of Contents (VTOC) are expected to consist of 50 records, each formatted with a key length of 44 bytes and a data length of 96 bytes. It is possible for a write operation to overlay one of these tracks with a different format. For example, the new data may have a key length of 130 (instead of 44). When this happens in the VTOC, then the write may overlay the pointers to existing data sets, which then make the existing data sets inaccessible.

When this happens, determining with diagnostics which application was responsible for the write operation that overlaid the track is difficult, unless the error can be reproduced. Reproducing the error may also be difficult. Also, by the time the error has been detected, there may not be a diagnostic tool available that will show the write activity of the track that was overlaid.

BRIEF SUMMARY

Provided are a method, computer program product, and system for storing one or more storage rules for each of one or more storage locations, along with one or more actions to be taken for each storage rule that is violated, intercepting an I/O operation issued to the storage subsystem, and determining whether the I/O operation violates one or more of the storage rules. In response to determining that the I/O operation violates one or more of the storage rules, an application that issued the I/O operation is identified and each of the one or more actions associated with the one or more violated storage rules are performed.

BRIEF DESCRIPTION OF THE SEVERAL
VIEWS OF THE DRAWINGS

Referring now to the drawings in which like reference numbers represent corresponding parts throughout:

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

With embodiments, storage rules may be defined. Each storage rule specifies an expected format and/or pattern for a portion of storage (e.g., an entire volume, specific cylinders on a volume, or specific tracks or records on a volume) on a storage subsystem. Each storage rule also defines at least one action to be taken if that storage rule is violated. Then, I/O operations (i.e., read and write operations) that are issued to the storage subsystem are monitored to identify those I/O operations that violate the storage rules. For each I/O operation that violates a storage rule, the application that issued the I/O operation is identified and the at least one action associated with the violated storage rule is performed.

Figure 1:
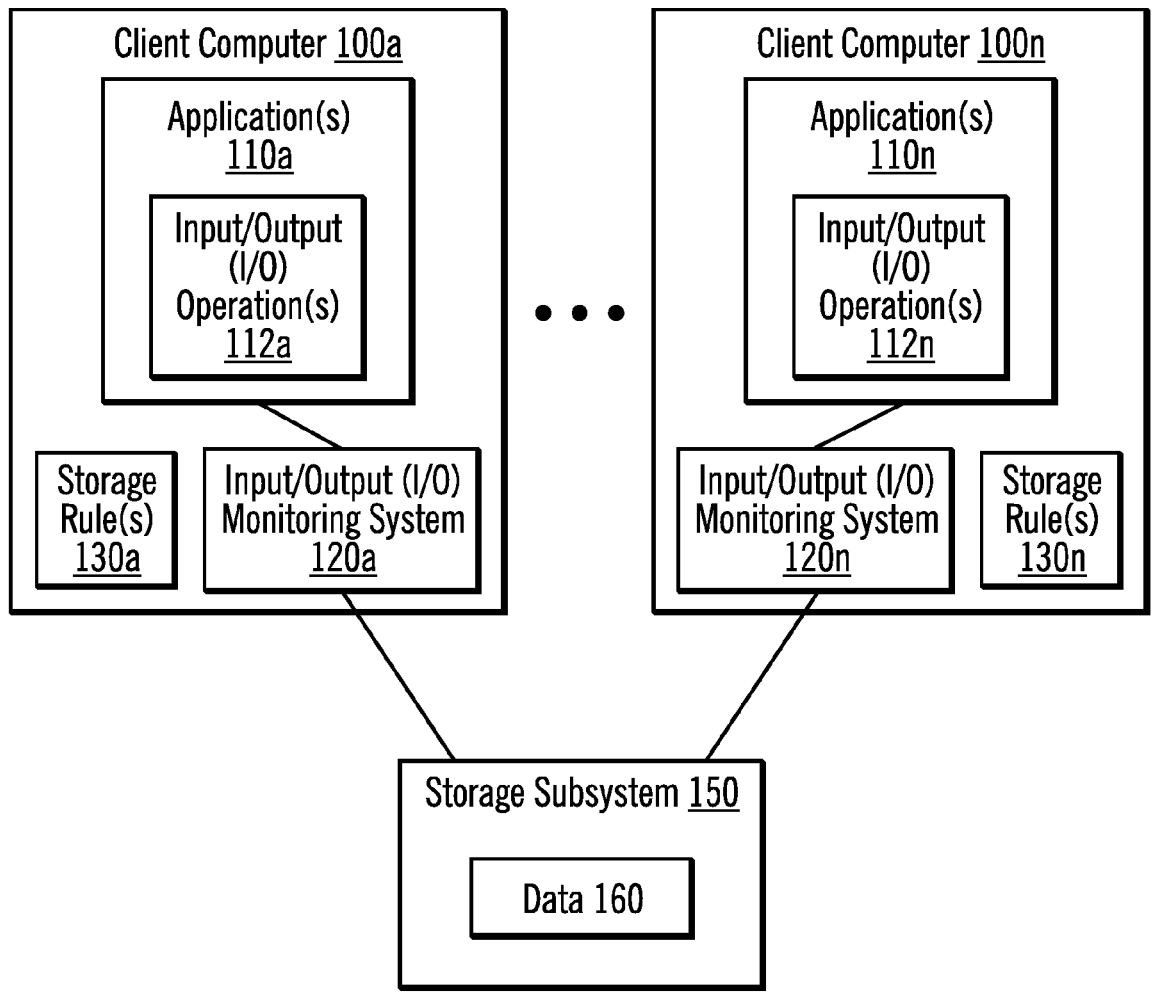
FIG. 1 illustrates, in a block diagram, a computing architecture in accordance with certain embodiments.

FIG. 1 illustrates, in a block diagram, a computing architecture in accordance with certain embodiments. Client computers 100a . . . 100n are coupled to a storage subsystem 150. Each client computer 100a . . . 100n includes, respectively, one or more applications 110a . . . 110n, an I/O monitoring system 120a . . . 120n, and one or more storage rules 130a . . . 130n. The applications 110a . . . 110n may include client applications and/or applications internal to an operating system.

The computing device is coupled to a storage subsystem 150 storing data 160. Each of the one or more applications 110a . . . 110n issues I/O operations 112a . . . 112n (i.e., read and write) to the storage subsystem 150.

The I/O monitoring system 120 allows adding storage rules 130 that can be used to monitor read and write activity to specific areas of storage on the storage subsystem 150. In certain embodiments, the storage rules 120 allow specification of an entire volume, specific cylinders on a volume, or specific tracks or records on a volume. In various embodiments, a storage rule 130 is applied to other portions of storage (e.g., multiple tracks, contiguous tracks, alternating tracks, etc.).

The I/O monitoring system 120 sets a storage rule 130 as to the expected format and/or pattern on a portion of storage (e.g., a track). A storage rule 130a . . . 130n may be described as a format and/or pattern for a portion of storage in the storage subsystem 150. In embodiments, the storage rules 130a . . . 130n can also indicate specific bit patterns to be monitored or can include the monitoring of all bit patterns, that is, any read or write operation.

The I/O monitoring system 120 monitors I/O operations 112a . . . 112n (i.e., read or write operations) to the portion of storage on the storage subsystem 150 to prevent an I/O operation 112a . . . 112n that violates a storage rule 130. If a storage rule 130 is violated, the I/O monitoring system 120 is able to identify which application 110a . . . 110n (i.e., violator) issued the I/O operation 112a . . . 112n.

Figure 2:
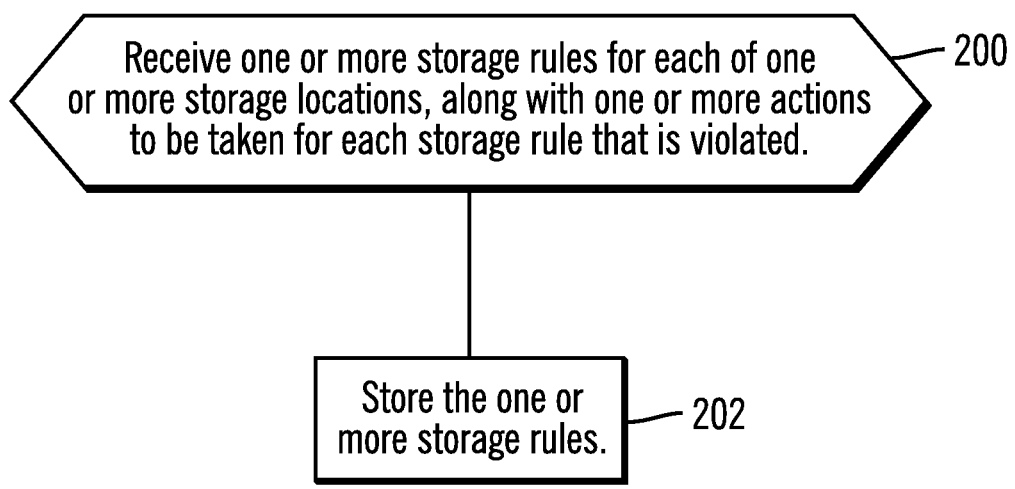
FIG. 2 illustrates, in a flow diagram, processing for storage rules in accordance with certain embodiments.

FIG. 2 illustrates, in a flow diagram, processing for storage rules 130 in accordance with certain embodiments. Control begins at block 200 with the I/O monitoring system 120 receiving one or more storage rules 130 for each of one or more storage locations, along with one or more actions to be taken for each storage rule 130 that is violated. In block 202, the I/O monitoring system 120 stores the one or more storage rules 130.

In certain embodiments, a storage rule 130 specifies a storage location (e.g., a track location) and a format and/or pattern that should be followed for data stored at the storage location. In certain embodiments, the I/O monitoring system 120 provides a user interface that enables a user to specify, for each storage location, one or more storage rules 130. In certain embodiments, the user may use the user interface to specify, for multiple storage locations, one or more storage rules 130. Also, the user may use the user interface to indicate one or more actions to be performed if a storage rule 130 is violated. The I/O monitoring system 120 performs the one or more actions when the I/O operation 112a ... 112n violates a storage rule 130. In various embodiments, a user may specify the storage rules without using a user interface.

Figure 3:
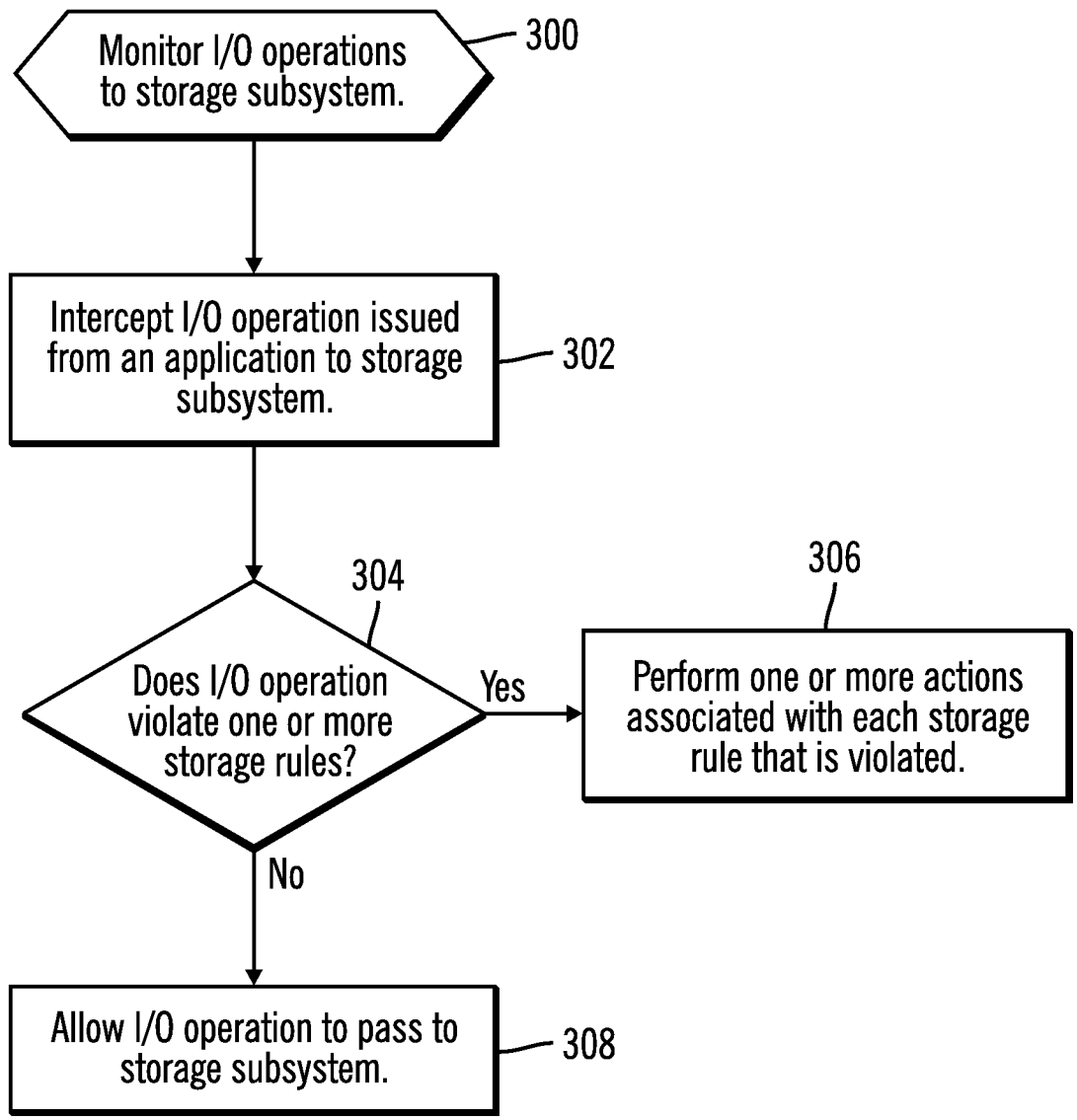
FIG. 3 illustrates, in a flow diagram, processing performed by an I/O monitoring system in accordance with certain embodiment.

FIG. 3 illustrates, in a flow diagram, processing performed by the I/O monitoring system 120 in accordance with certain embodiment. Control begins in block 300 with the I/O monitoring system 120 monitoring I/O operations 112a ... 112n the to storage subsystem 150. In block 302, the I/O monitoring system 120 intercepts an I/O operation 112a ... 112n issued from an application 110a ... 110n to the storage subsystem 150.

In block 304, the I/O monitoring system 120 determines whether the I/O operation 112a ... 112n violates one or more storage rules 130. If so, processing continues to block 306, otherwise, processing continues to block 308. The I/O operation 112a ... 112n specifies the storage location and data. In certain embodiments, the I/O monitoring system 120 makes the determination of whether there is a violation by matching the format and/or pattern of the data of the I/O operation 112a ... 112n against the one or more storage rules 130 for the location specified in the I/O operation 112a ... 112n.

In block 306, the I/O monitoring system 120 performs one or more actions associated with storage rule that is violated. When a violation occurs, the I/O monitoring system 120 performs the one or more actions depending on the options the user specified when creating the one or more storage rules 130. In block 308, I/O monitoring system 120 allows the I/O operation 112a ... 112n to pass to the storage subsystem 150.

Thus, the I/O monitoring system 120 checks the I/O operations 112a ... 112n to see if the I/O operations 112a ... 112n are writing the format and/or pattern specified for that storage location before the I/O operations are issued to the storage subsystem 150. Once an I/O operation 112a ... 112n is issued to the storage subsystem 150, it is difficult to determine which application 100a ... 100n issued that I/O operation 112a ... 112n.

Figure 4:
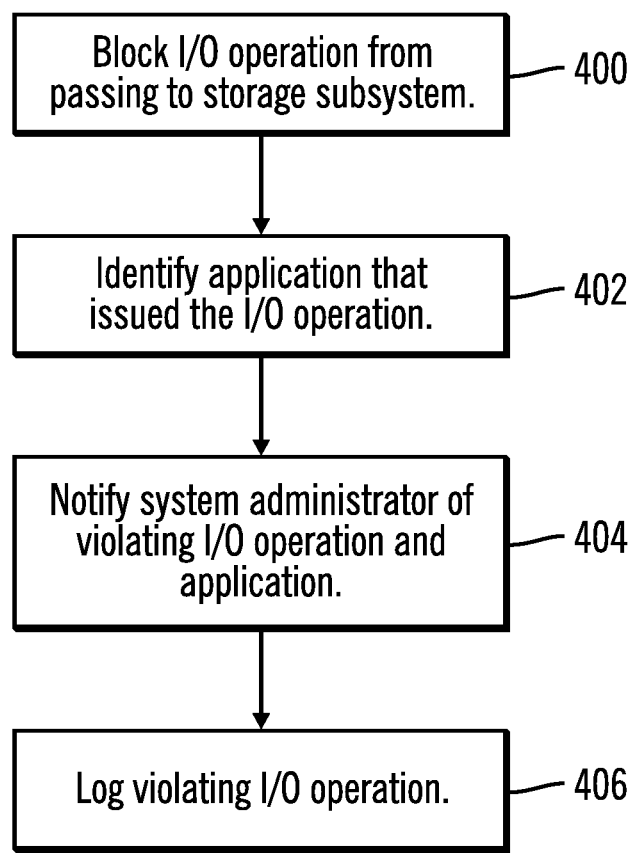
FIG. 4 illustrates an example of actions that may be taken when an I/O monitoring system determines that an I/O operation violates one or more storage rules in accordance with certain embodiments.

FIG. 4 illustrates an example of actions that may be taken when the I/O monitoring system 120 determines that an I/O operation 112a ... 112n violates one or more storage rules 130 in accordance with certain embodiments. In block 400, the I/O monitoring system 120 blocks the I/O operation 112a ... 112n from passing to the storage subsystem 150 (i.e., the violating I/O is rejected). In block 402, the I/O monitoring system 120 identifies the application 110a ... 110n that issued the I/O operation 112a ... 112n. In certain embodiments, the I/O monitoring system 120 identifies the application 110a ... 110n depends depending on the type of client computer 100a ... 110n on which the I/O monitoring system 120 is operating (e.g., executing). In certain embodiments, for example, each I/O operation 112a ... 112n includes information that identifies the application 110a ... 110n that issued the I/O operation 112a ... 112n For example, the information included in the I/O operation 112a ... 112n may be a task name, a task number, a user ID of a user executing the application, or an address space in which the application 110a ... 110n is executing. In certain embodiments, information about the application 110a ... 110n and the violating I/O operation 112a ... 112n is stored at the storage subsystem 150. Then, at a later time (e.g., a day or a month later), if a user is interested in identifying the application 110a ... 110n that issued the violating I/O operation 112a ... 112n, the user is able to access the stored information.

In block 404, the I/O monitoring system 120 notifies a user (e.g., a system administrator) of the violating I/O operation 112a ... 112n and application 110a ... 110n (i.e., an operator message is issued). In block 406, the I/O monitoring system 120 logs the violating I/O operation 112a ... 112n. In various embodiments, any combination of the example actions of FIG. 4 may be performed in combination with zero or more other actions.

In embodiments, the user has the ability to dynamically start and stop the I/O monitoring system 120 and may change the storage rules 130.

Thus, the I/O monitoring system 120 allows adding storage rules 130 (i.e., storage policies) which can be used to monitor read and write activity to specific areas of a storage volume, such as the cylinder, track or record level. The storage rules 130 allow for the specification of the entire volume, specific cylinders on a volume, or specific tracks or records on a volume (i.e. very granular specification). The storage rules 130 can also indicate specific bit patterns to be monitored or can include the monitoring of all bit patterns, that is, any read or write I/O operation 112a ... 112n. If an I/O operation 112a ... 112n occurs that violates the storage rules 130, the issuer of the read or write operation is identified.

Although the I/O monitoring system 120 detects write operations that overlay areas of a volume that contain control program information, such as the VTOC, I/O monitoring system 120 is not limited to write-type operations. The I/O monitoring system 120 monitors read-type access to a storage area (e.g., a volume or a specific area on a volume).

In certain embodiments, the I/O monitoring system 120 is independent of vendor-specific software and/or hardware since the monitoring activity is accomplished at a level of the operating system that is executed just prior to an I/O operation 112a ... 112n getting issued to the storage subsystem 150. That is, the monitoring activity takes place at a point in the operating system that is given control just prior to the I/O operation 112a ... 112n getting issued to the storage subsystem 150.

In addition, the monitoring is done solely with the I/O monitoring system 120 and does not require any modification of components (e.g., other software) within the storage subsystem 150. That is, the I/O monitoring system 120 is device-independent.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The I/O monitoring system 120 may be implemented as hardware (e.g., hardware logic or circuitry), software, or a combination of hardware and software.

Figure 5:
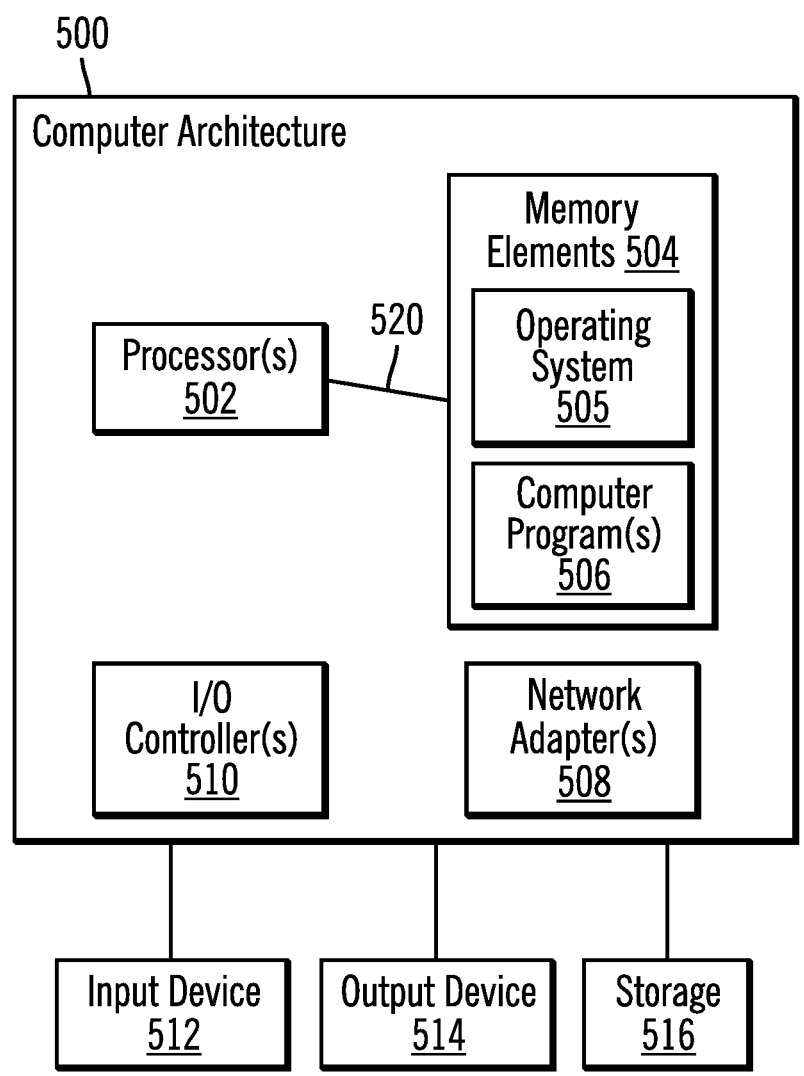
FIG. 5 illustrates, in a block diagram, a computer architecture that may be used in accordance with certain embodiments.

FIG. 5 illustrates a computer architecture 500 that may be used in accordance with certain embodiments. Client computers 100a . . . 100n may each implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   storing one or more storage rules for each of one or more storage locations on a storage subsystem, along with one or more actions to be taken for each storage rule that is violated, wherein each of the storage rules identifies a storage location and at least one of a format of data and a pattern of the data at that storage location;
   intercepting an Input/Output (I/O) operation issued to the storage subsystem, wherein the I/O operation specifies a storage location;
   before the I/O operation is issued to the storage subsystem, determining whether the I/O operation violates one or more of the storage rules by matching at least one of a format of data and a pattern of data of the I/O operation against the at least one of the format of data and the pattern of data in the one or more storage rules for the storage location specified in the I/O operation;
   in response to determining that the I/O operation violates one or more of the storage rules,
      identifying an application that issued the I/O operation; and
      performing each of the one or more actions associated with the one or more of the violated storage rules; and
   in response to determining that the I/O operation does not violate one or more of the storage rules, allowing the I/O operation to pass to the storage subsystem.

2. The method of claim 1, wherein the I/O operation is one of a read operation and a write operation.

3. The method of claim 1, further comprising:
   monitoring I/O operations issued to the storage subsystem.

4. The method of claim 1, wherein the one or more actions are selected from a group of actions comprised of: blocking the I/O operation from passing to the storage subsystem, notifying a user of the violating I/O operation and the application, and logging the violating I/O operation.

5. A system, comprising:
   a processor; and
   storage coupled to the processor, wherein the storage stores a computer program, and wherein the computer program is executed by the processor to perform operations, the operations comprising:
      storing one or more storage rules for each of one or more storage locations on a storage subsystem, along with one or more actions to be taken for each storage rule that is violated, wherein each of the storage rules identifies a storage location and at least one of a format of data and a pattern of the data at that storage location;
      intercepting an Input/Output (I/O) operation issued to the storage subsystem, wherein the I/O operation specifies a storage location;
      before the I/O operation is issued to the storage subsystem, determining whether the I/O operation violates one or more of the storage rules by matching at least one of a format of data and a pattern of data of the I/O operation against the at least one of the format of data and the pattern of data in the one or more storage rules for the storage location specified in the I/O operation;
      in response to determining that the I/O operation violates one or more of the storage rules,
         identifying an application that issued the I/O operation; and
         performing each of the one or more actions associated with the one or more of the violated storage rules; and
      in response to determining that the I/O operation does not violate one or more of the storage rules, allowing the I/O operation to pass to the storage subsystem.

6. The system of claim 5, wherein the I/O operation is one of a read operation and a write operation.

7. The system of claim 5, wherein the operations further comprise:
   monitoring I/O operations issued to the storage subsystem.

8. The system of claim 5, wherein the one or more actions are selected from a group of actions comprised of: blocking the I/O operation from passing to the storage subsystem, notifying a user of the violating I/O operation and the application, and logging the violating I/O operation.

9. A computer program product, the computer program product comprising:
a non-transitory computer readable storage medium having computer readable program code embodied therewith, the computer readable program code, when executed by a processor of a computer, is configured to perform:
storing one or more storage rules for each of one or more storage locations on a storage subsystem, along with one or more actions to be taken for each storage rule that is violated, wherein each of the storage rules identifies a storage location and at least one of a format of data and a pattern of the data at that storage location;
intercepting an Input/Output (I/O) operation issued to the storage subsystem, wherein the I/O operation specifies a storage location;
before the I/O operation is issued to the storage subsystem, determining whether the I/O operation violates one or more of the storage rules by matching at least one of a format of data and a pattern of data of the I/O operation against the at least one of the format of data and the pattern of data in the one or more storage rules for the storage location specified in the I/O operation;
in response to determining that the I/O operation violates one or more of the storage rules,
identifying an application that issued the I/O operation; and
performing each of the one or more actions associated with the one or more of the violated storage rules; and
in response to determining that the I/O operation does not violate one or more of the storage rules, allowing the I/O operation to pass to the storage subsystem.

10. The computer program product of claim 9, wherein the I/O operation is one of a read operation and a write operation.

11. The computer program product of claim 9, wherein the computer readable program code, when executed by the processor of the computer, is configured to perform:
monitoring I/O operations issued to the storage subsystem.

12. The computer program product of claim 9, wherein the one or more actions are selected from a group of actions comprised of: blocking the I/O operation from passing to the storage subsystem, notifying a user of the violating I/O operation and the application, and logging the violating I/O operation.

* * * * *